(12) United States Patent
Borgomeo (10) Patent No.: US 12,291,486 B2
(45) Date of Patent: May 6, 2025

(54) PORCELAIN STONEWARE PRODUCTION PROCESS AND PRODUCTS

(71) Applicant: SAXA GRESTONE S.P.A., Roccasecca (IT)

(72) Inventor: Francesco Borgomeo, Rome (IT)

(73) Assignee: SAXA GRESTONE S.P.A., Roccasecca (IT)

( * ) Notice: Subject to any disclaimer, the term of this patent is extended or adjusted under 35 U.S.C. 154(b) by 1156 days.

(21) Appl. No.: 17/049,313

(22) PCT Filed: Apr. 18, 2019

(86) PCT No.: PCT/IB2019/053224
§ 371 (c)(1),
(2) Date: Oct. 20, 2020

(87) PCT Pub. No.: WO2019/207433
PCT Pub. Date: Oct. 31, 2019

(65) Prior Publication Data
US 2021/0347695 A1  Nov. 11, 2021

(30) Foreign Application Priority Data

Apr. 23, 2018 (IT) .................. 102018000004789

(51) Int. Cl.
*C04B 33/135* (2006.01)
*B03B 9/04* (2006.01)
(Continued)

(52) U.S. Cl.
CPC ............ *C04B 33/1355* (2013.01); *B03B 9/04* (2013.01); *B09B 3/25* (2022.01); *B09B 3/40* (2022.01);
(Continued)

(58) Field of Classification Search
CPC ..... C04B 33/1355; C04B 33/24; C04B 33/32; C04B 35/6261; C04B 2235/349;
(Continued)

(56) References Cited

U.S. PATENT DOCUMENTS

| 6,342,461 | B1* | 1/2002 | Lee ................... C04B 33/1327 501/141 |
| 2011/0100260 | A1* | 5/2011 | Quadrio Curzio ........ B03B 9/04 106/405 |
| 2012/0082839 | A1* | 4/2012 | Ha ......................... C04B 16/04 428/221 |

FOREIGN PATENT DOCUMENTS

| EP | 2660219 A1 | 11/2013 |
| JP | H06339672 A | 12/1994 |

(Continued)

OTHER PUBLICATIONS

Hernandez-Crespo et al., "New porcelainized stoneware materials obtained by recycling of MSW incinerator fly ashes and granite sawing residue" Ceramics Internatonal, 27. 713-720. 10.1016/S0272-8842(01)00025-6.

(Continued)

*Primary Examiner* — James A Fiorito
*Assistant Examiner* — Cameron K Miller
(74) *Attorney, Agent, or Firm* — ArentFox Schiff LLP (57) ABSTRACT

The present invention relates to a technology for the production of porcelain stoneware products, wherein the treatment process allows to re-use recovery materials coming from the treatment of urban waste.
In particular, the present invention relates to the production of products for the construction of driveways.

12 Claims, 11 Drawing Sheets

(51) Int. Cl.
- *B09B 3/00* (2022.01)
- *B09B 3/25* (2022.01)
- *B09B 3/40* (2022.01)
- *B28B 3/02* (2006.01)
- *B28B 3/20* (2006.01)
- *C04B 33/24* (2006.01)
- *C04B 33/32* (2006.01)
- *C04B 35/626* (2006.01)
- *C22B 7/00* (2006.01)
- *B09B 101/30* (2022.01)

(52) U.S. Cl.
CPC .............. *B28B 3/02* (2013.01); *B28B 3/20* (2013.01); *C04B 33/24* (2013.01); *C04B 33/32* (2013.01); *C04B 35/6261* (2013.01); *C22B 7/005* (2013.01); *B09B 2101/30* (2022.01); *C04B 2235/349* (2013.01); *C04B 2235/5436* (2013.01); *C04B 2235/6021* (2013.01); *C04B 2235/604* (2013.01); *C04B 2235/6567* (2013.01)

(58) Field of Classification Search
CPC .... C04B 2235/5436; C04B 2235/6021; C04B 2235/604; C04B 2235/6567; B03B 9/04; B09B 3/25; B28B 3/02; B28B 3/20; C22B 7/005

See application file for complete search history.

(56) References Cited

FOREIGN PATENT DOCUMENTS

| WO | 9511865 A1 | 5/1995 | |
|---|---|---|---|
| WO | WO-2008017082 A1 * | 2/2008 | ............. C04B 33/10 |
| WO | 2008142607 A2 | 11/2008 | |
| WO | 2009138823 A1 | 11/2009 | |

OTHER PUBLICATIONS

Rambaldi et al., "The recycling of MSWI bottom ash in silicate based ceramic" Ceramics International, 36. pp. 2469-2476. 10.1016/j.ceramint.2010.08.005.

International Search Report and Written Opinion issued in corresponding International Application No. PCT/IB2019/053224 mailed Jul. 2, 2019.

Biganzoll Laura et al; "Aluminium recovery from waste incineration bottom ash, andits oxidation level", Waste management & research, Sep. 2013, pp. 954-959.

Pal Mousumi et al; "Thermal analysis and vitrification behavior of slag containing porcelain stoneware body". Journal of Thermal Analysis and Calorimetry, vol. 124, No. 3, Jan. 25, 2016 (Jan. 25, 2016), pp. 1169-1177.

A. R Siddiqui et al; "Iron and Steel Slag: An Alternative Source of Raw Materials for Porcelain Ceramics", Global NEST Journal Copyright© 2014, pp. 587-596.

* cited by examiner

PORCELAIN STONEWARE PRODUCTION PROCESS AND PRODUCTS

The present disclosure is a national stage application of International Patent Application No. PCT/IB2019/053224, which was filed on Apr. 18, 2019 and claims the priority of Italian Patent Application No. 102018000004789, filed on Apr. 23, 2018 and entitled "PORCELAIN STONEWARE PRODUCTION PROCESS AND PRODUCTS," and the disclosure content of each of which is hereby incorporated by reference into the present application.

DESCRIPTION

Technical Field of the Invention

The present invention relates to a technology for the production of porcelain stoneware products, wherein the treatment process allows the re-use of recycled materials deriving from the treatment of urban waste.

In particular, the present invention relates to the production of products for the construction of driveways.

Background

It is known that quarries are capable of producing natural materials such as basalts, granites and marbles are almost exhausted and however they are increasingly difficult to cultivate both for problems of quantity, and for problems linked to quantity, and for problems linked to environmental issues.

Similarly, the production of very particularly products, such as for example the "sanpietrini" made of leucite, is increasingly facing more difficulties linked to finding raw material and to environmental issues connected to the impact of quarries.

The "sanpietrino" is a small block of rock cut in truncated-pyramid shape, typically obtained from working volcanic rocks coming from the quarries located at the foot of Colli Albani (but even in the volcanic area of Viterbo). The name is due to the fact that at first they were used to pave St. Peter's Square in Rome. During time, their use has widely spread, especially in the old towns.

By extension the same definition is used for similar small blocks too, even having shapes not exactly equal to the classical sanpietrino, and/or made of other material such as for example porphyry.

For these reasons, today the need for a solution is much felt which could safeguard tradition and then allow to continue using products such as for example sanpietrini, at the same time by avoiding depletion of quarries, with beneficial effects both in economic terms and in terms of environmental impact.

SUMMARY OF THE INVENTION

The technical problem faced and solved by the present invention is then to provide a product alternative to sanpietrino and other similar product which however keeps the structural features thereof, of shape and mechanical resistance, and which then could usefully replace sanpietrino without losing tradition and effectiveness.

This is obtained through an element for driveways as defined by claim 1.

Additional features of the present invention are defined in the corresponding depending claims.

The idea underlying the present invention is to detect a material which, as alternative to rocks of various nature, could allow to obtain a product for the construction of driveways having at least the same, if not better, features in terms of mechanical resistance, appearance, and so on.

Such alternative material has been found in the porcelain stoneware.

As it is known, stoneware is a ceramic material having hard, compact, sound, waterproof paste, obtained by cooking until incipient vitrification of the mixture, it is often covered by a waterproof glaze. The nature of starting mixture varies depending upon the type and use. Usually a distinction is made among: ordinary (or common) stoneware, fine stoneware, porcelain stoneware, chemical stoneware.

The ordinary stoneware is obtained by mixing refractory plastic clays, generally containing iron, sometimes mixed with silica, limestone, feldspar, baked clay, and so on. Recipients are manufactured therewith to preserve food substances, pipes for liquids, floor or coating tiles.

The porcelain stoneware or fireclay, is manufactured with impure kaolin, vitrified in the mass like porcelain, it is used for hygienic-sanitary apparatuses wherein the aesthetical needs are limited and good resistance properties are required.

However, nowadays, no technique for producing porcelain stoneware products is known, having features with shape and structure such as those of the sanpietrino (or similar products).

The current technology for the treatment of ceramic mixtures for producing porcelain stoneware, allows to obtain products having thickness of 10-20 mm.

In fact, implementing a porcelain stoneware product having larger thickness than this, would compromise the quality of the product itself, to the point of making it clearly unusable for the prefixed purposes. In fact, a little resistant, too friable product, prone to break, and so on, would be obtained.

Another limit is constituted by the fact that producing high-thickness porcelain stoneware would require anomalous quantities of raw materials. It is to be reminded, for example, that 1 mq of stoneware having thickness of 10 mm weights about 20 kg, whereas if one produced with the same techniques a material with thickness of 60 mm its weight would be about 140 kg/mq.

Therefore, it results evident that the more the thickness increases, the more the unitary cost of the finished material increases, reaching probably not justifiable production costs.

With the present invention one wanted to give an answer even to these problems, by developing a process for producing porcelain stoneware products which indeed allows to obtain the above-outlined results, without the disadvantages which the current techniques would involve.

At the basis of this process solution there is the idea of re-using, in the preparation of the ceramic mixture, recovery materials, or better waste materials of other companies which usually are intended to be carried to special dumps indeed with often high transfer costs.

BRIEF DESCRIPTION OF THE FIGURES

The present invention, by overcoming the problems of known art, involves several and evident advantages which, together with the features and use modes of the present invention, will result evident by the following detailed description of preferred embodiments thereof, shown by way of example and not for limitative purposes and therefor the figures of the enclosed drawings will be referred to, wherein.

DETAILED DESCRIPTION OF EMBODIMENTS OF THE INVENTION

Some embodiments of the present invention will be described hereinafter, by making reference to the above-mentioned figures.

By way of preamble, the ceramic mixture therewith traditionally the porcelain stoneware is produced is usually constituted by the following components:
one or more alkaline feldspars;
usually they are sodium or potassium feldspars which can be found in Italy (Calabria or Sardinia) or in Turkey or in Pyrenees. Usually the feldspar enters the mixture with amounts not lower than 40-45%, and such raw material has the purpose of giving fusibility to the mixture itself, so that the melting temperature remains at values lower than 1200° C. The dosing of these ingredients, as well as their grinding level, allows to optimize the firing curve of the product and to give a structure without porosity thereto.
one or more plastic clays;
they are usually clays with high percentage of alumina (20-25%) with low amounts of iron oxide (light firing), or higher iron amounts (red-brown firing).
They enter the mixture around 35%. They have the purpose of keeping together the not plastic ingredients so as to provide malleability and workability to the mixture before cooking. The most precious clays can be found in Germany and Ukraine and in lower percentage in Spain.
Inerts or fillers;
The inerts can be quartz or feldspathic sands, pre-cooked kaolins, chamotte. Usually they enter the ceramic mixture with % around 15-20% and usually the come from local quarries and then represent even the less expensive portion of the mixture.

With the objective which was indicated above, many solutions were tried to integrate recovery materials in the mixtures for producing porcelain stoneware, with the purpose of detecting the one which would meet at best all sofar highlighted requirements.

To this purpose, crystals of automobiles, phials of medicines, glasses of bottles (all treated suitably), or ashes of power plants, that is the ashes which constitute the solid residue, which the thermoelectric power plants produce during the coal combustion phase, were then tested.

However, none of these materials allowed to obtain the wished results.

Then, the inventors thought to use the ashes produced by the incinerators of urban waste.

In fact, in the modern incinerators, these, after having been crushed and minced, are treated in specific self-combustion ovens by obtaining as main product electric energy and as by-product (waste product) combustion ashes up to now destined to special dumps.

With the present invention one has arrived to introduce into the mixture for producing porcelain stoneware such ashes coming from waste-to-energy plants (with partial replacement of other raw materials) without the technical features of the product being altered and consequently the use of this raw material (ashes) involves the evident advantage of lowering sensibly the cost of the mixture and solve then the problem of the cost of the mixture for producing high thicknesses.

Figure 1A:
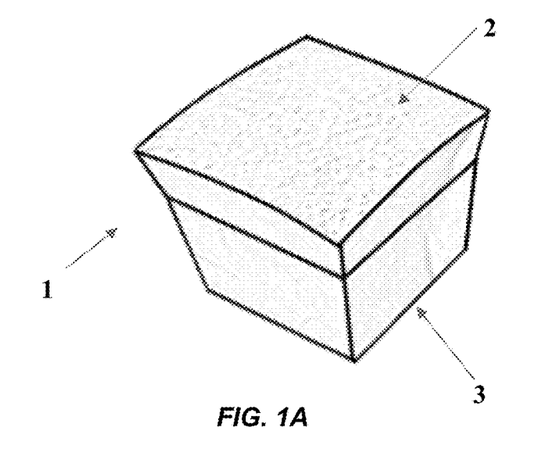
FIGS. 1A to 1C show examples of sanpietrini according to the present invention.
Figure 1B:
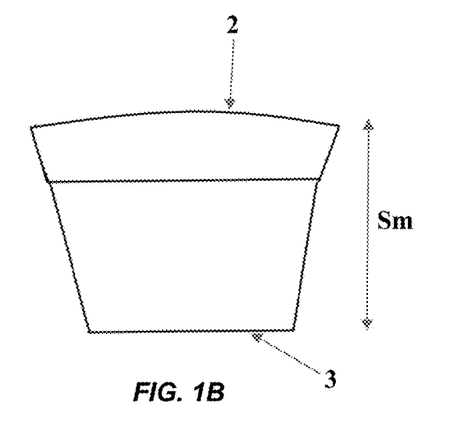
Figure 1C:
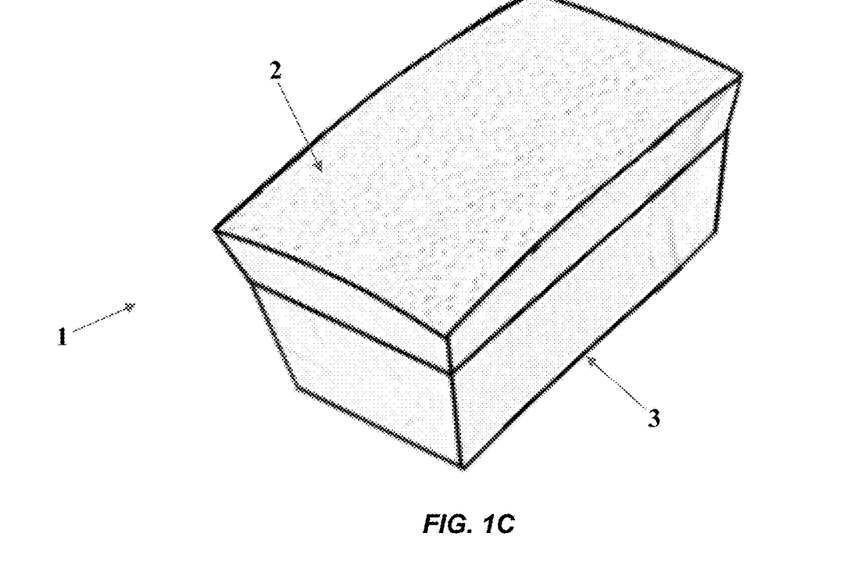

By firstly referring to FIGS. 1A to 1C they show some examples of porcelain stoneware products according to the present invention, in particular sanpietrini.

For example, FIG. 1 shows a sanpietrino 1 made of porcelain stoneware usable as element of a driveway.

The sanpietrino 1 has a tread surface 2 and a base surface 3, and it is characterized in that it has an average thickness Sm, measured between the tread surface 2 and the base surface 3, which on the average is greater than or equal to 4.5 cm.

An indication of the average thickness is provided, considering that the tread and base surfaces can be not perfectly regular (even intentionally to give a particular aspect to the sanpietrino).

As already explained, advantageously, an element for the construction of driveways according to the present invention, made of porcelain stoneware, could include in its composition a percentage Pc other than zero of recycled material coming from the treatment of waste.

In particular, the recycled material could advantageously come from processes for treating urban waste and substantially comprise the residual ashes from the combustion of such waste.

Preferably, the percentage Pc of recycled material, in particular ashes, is between 1% and 40% of the volume of the mixture used for the production of porcelain stoneware.

According to a preferred embodiment, such percentage Pc is between 10% and 30%, still more preferably between 15% and 25%.

From a geometrical point of view, according to a possible embodiment, an element according to the present invention has a tread surface 2 the sizes thereof are about 10×10 cm.

However, it is to be meant that even elements with different shape, such as for example special pieces for pavements, angles, and so on, can be implemented with the same chemical/physical feature.

For example, elements could be provided, the tread surface thereof (2) has the sizes of about 20×20 cm or 20×40 cm or 40×60 cm.

Still, according to an additional embodiment, an element can be provided, the tread surface thereof 2 has sizes of approximately 4.5×4.5 cm.

Generally, all elements produced according to the present invention, have a base surface 3, the extension thereof, with respect to that of the tread surface 2, can be in a variable ratio between 0.1 and 1.3, proportion corresponding to sizes which indicatively can vary between 1×1 cm to 13×13 cm.

According to the preferred embodiments, an element of the invention has a substantially truncated-pyramid shape, the tread surface 2 of which represents a large base thereof. Then, excepting some special pieces, in this case the base surface 3 will always have a lower extension than that of the tread surface 2.

However, it will have to be meant that the base surface 3 could also have an extension equal to zero, or almost zero, this involving a substantially pyramidal shape.

At last, as already reminded, the shapes attributed to such elements, have not to be considered necessarily regular in the strictly mathematical sense. Actually, deviations from the regular geometrical shapes can be also wished and inserted intentionally to provide the pieces a more 'artisan' and less 'standard aspect.

As already stated, the average thickness Sm of such elements is greater than or equal to 4.5 cm. However, preferred embodiments thereof provide an average thickness Sm greater than or equal to 6 cm.

Figure 2A:
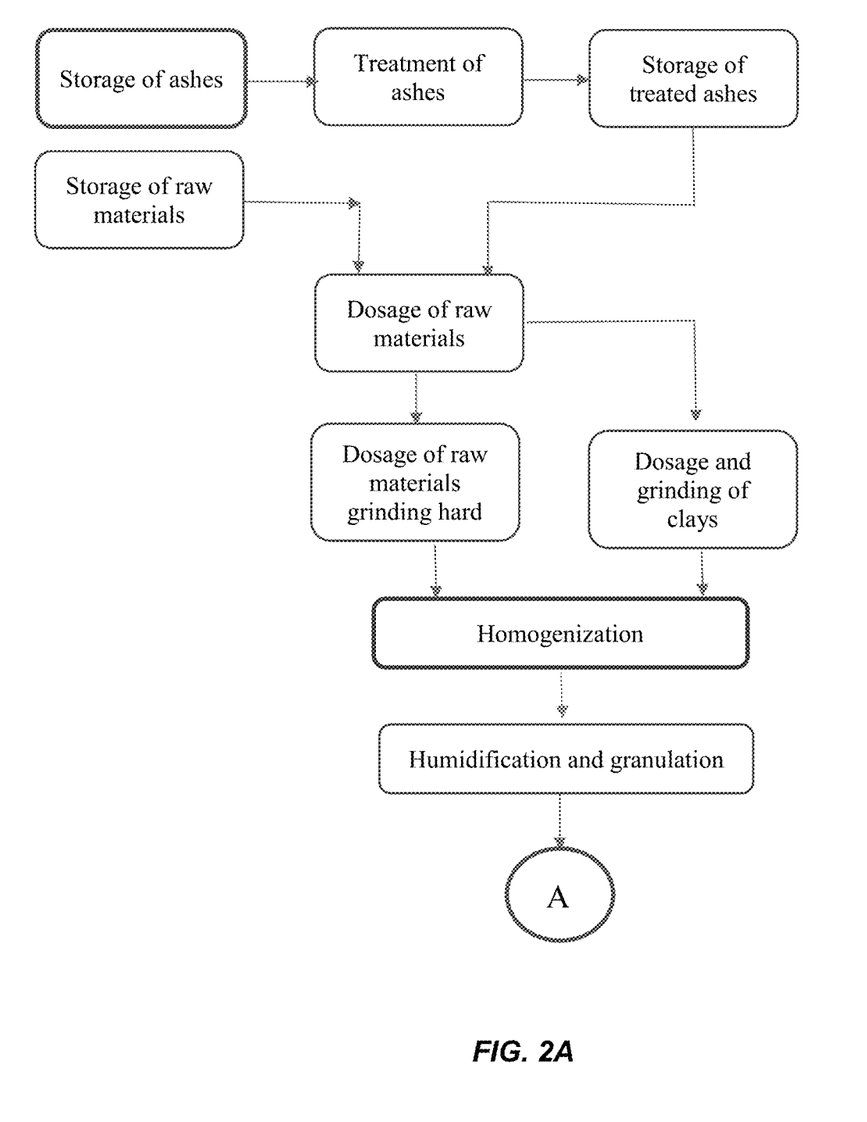
FIGS. 2A to 2C show a flowchart of a possible implementation of a process according to the present invention.
Figure 2B:
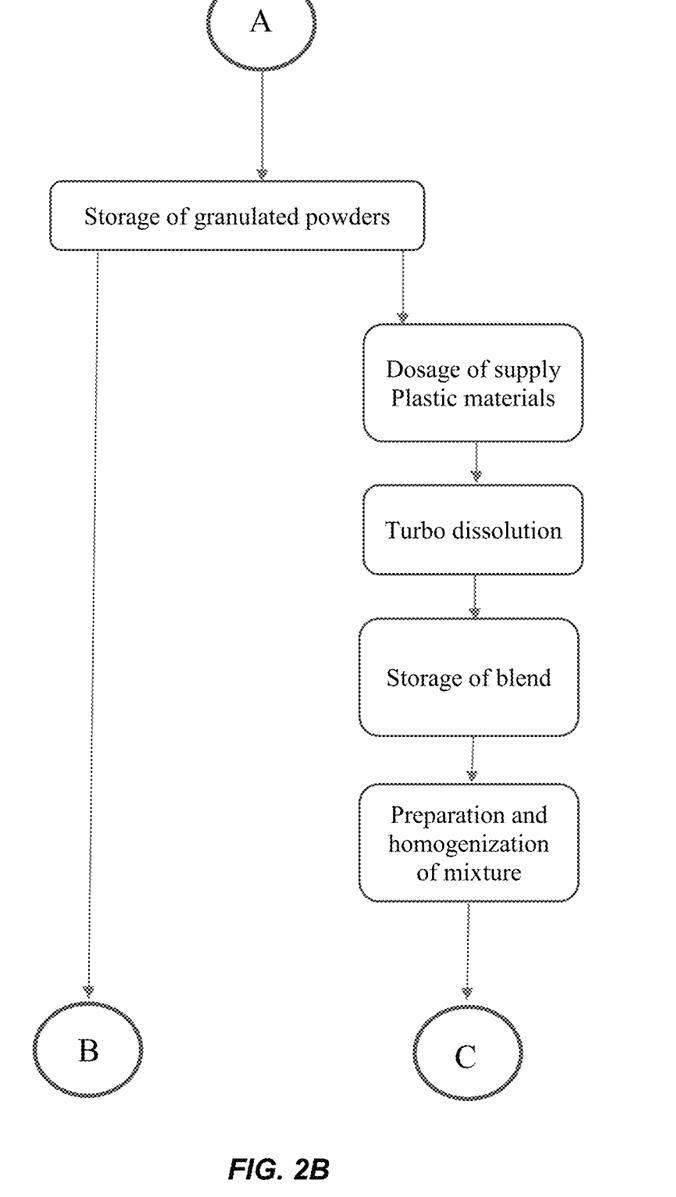
Figure 2C:
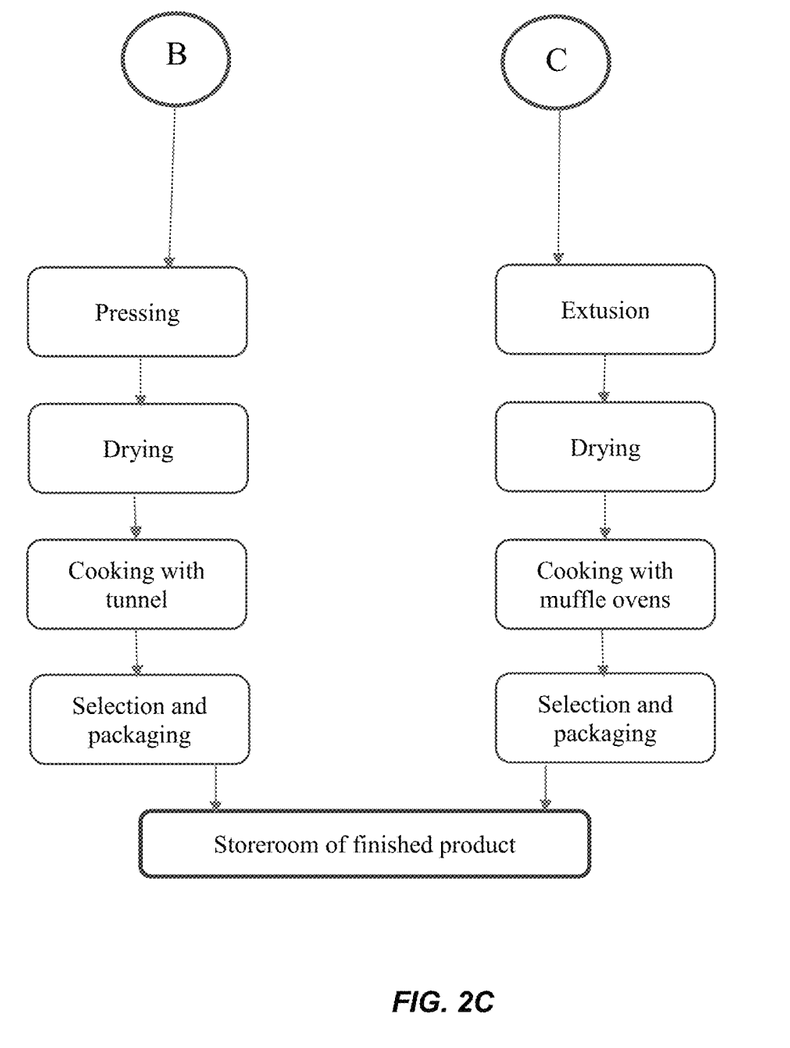
Figure 3A:
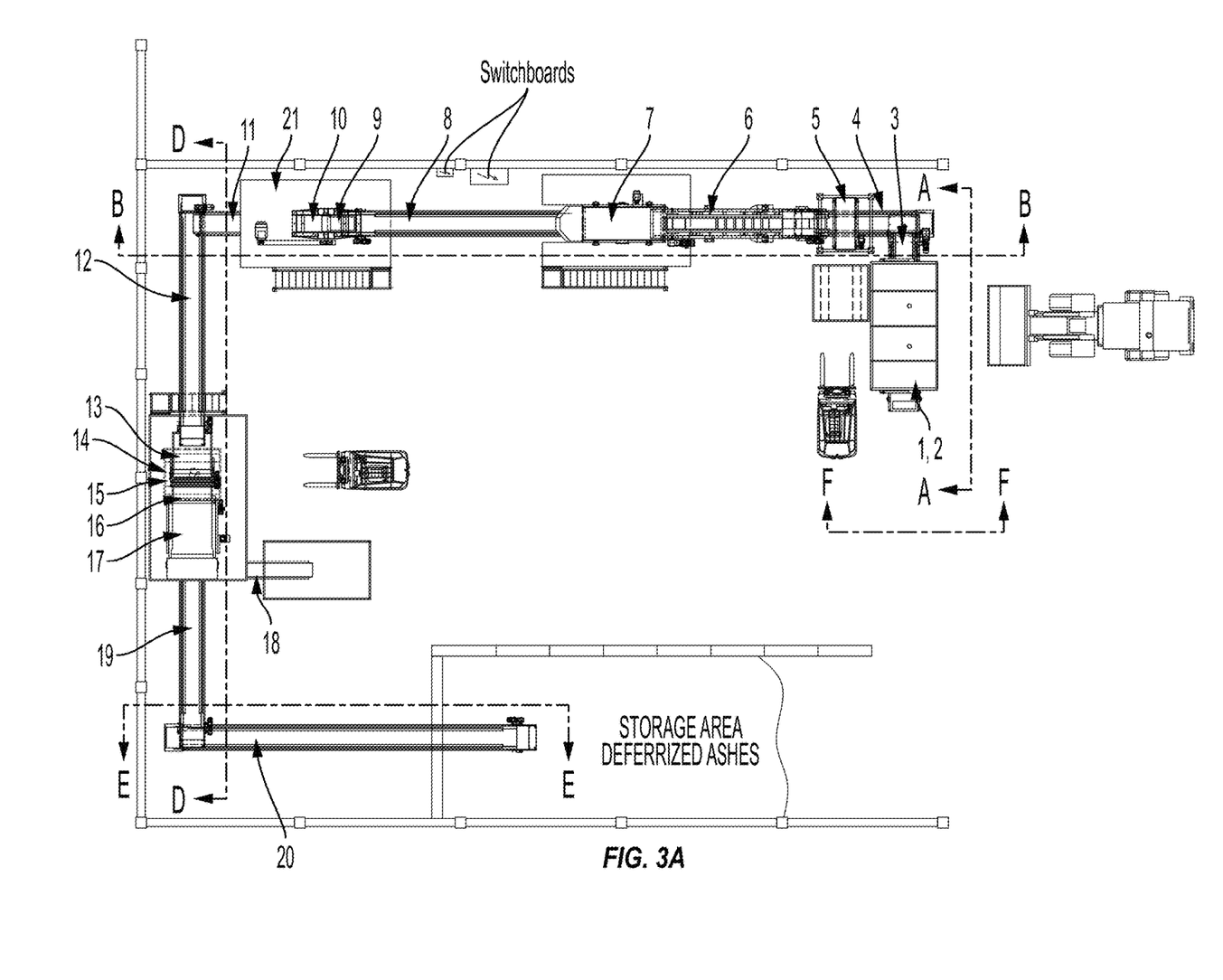
FIGS. 3A to 3F illustrate by way of example a possible plant for demetallizing ashes according to the present invention.
Figure 3B:
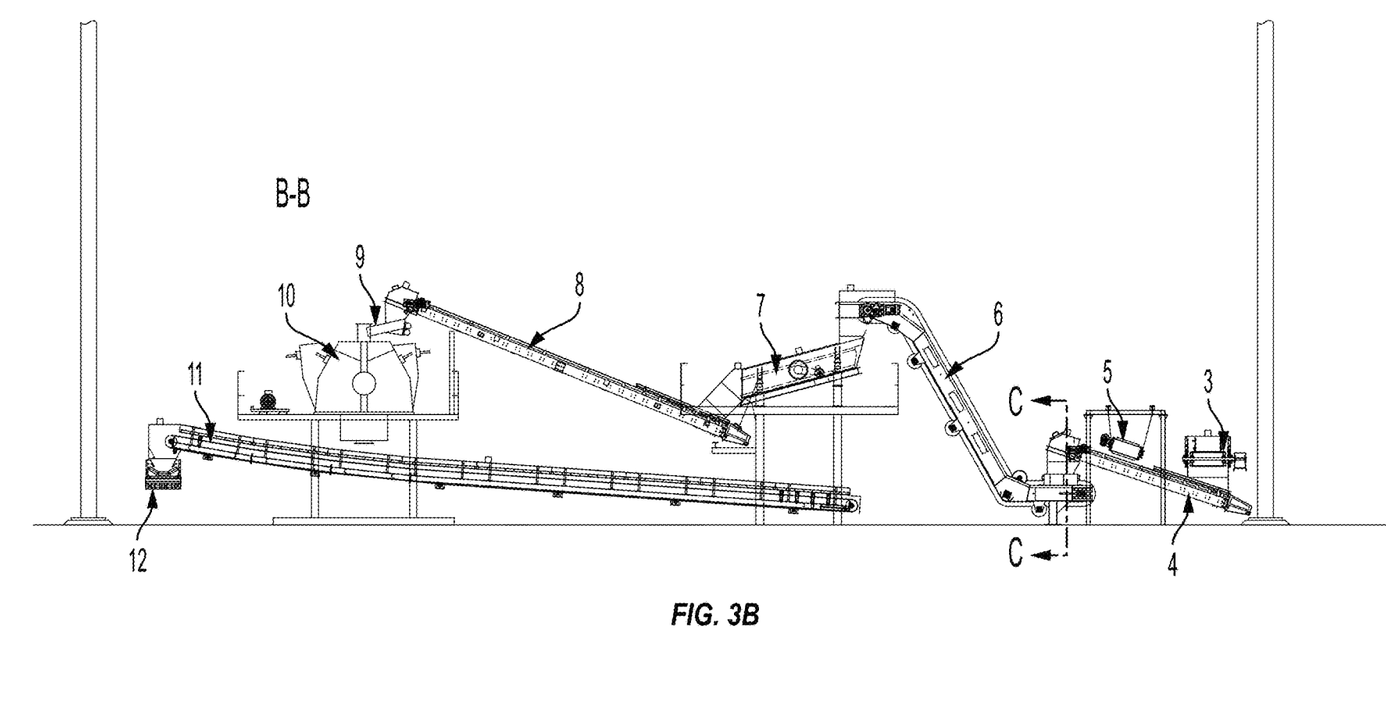
Figure 3C:
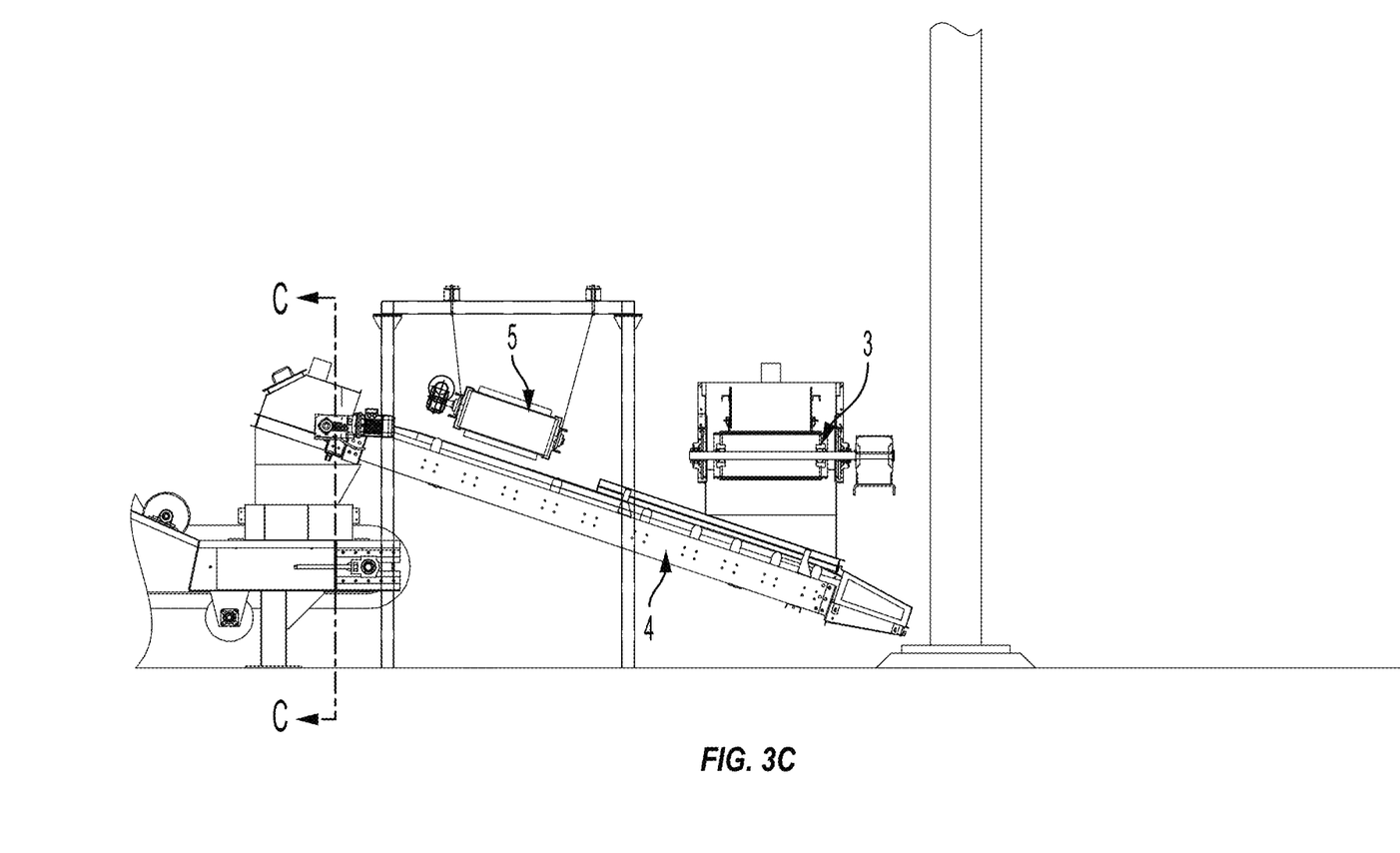
Figure 3D:
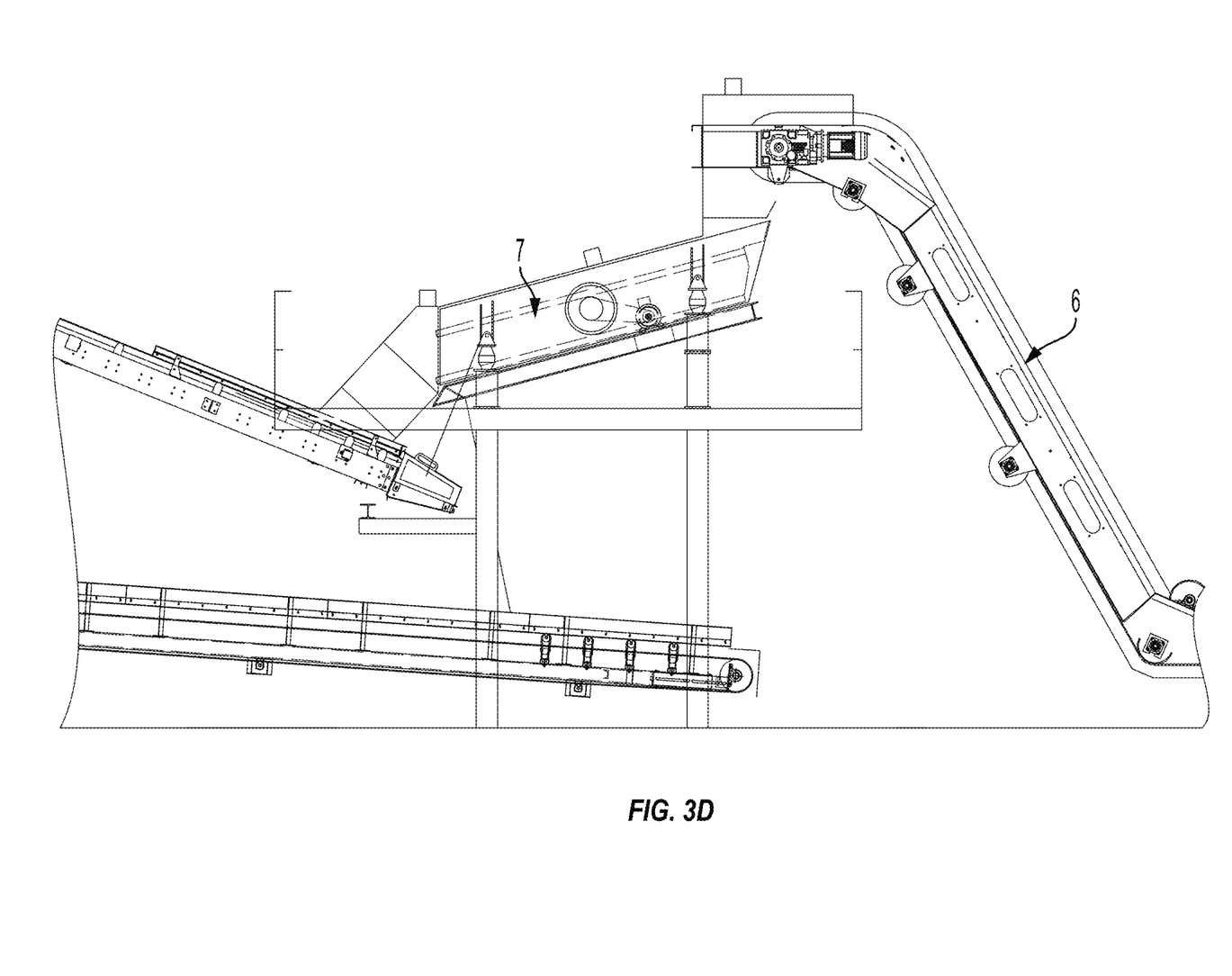
Figure 3E:
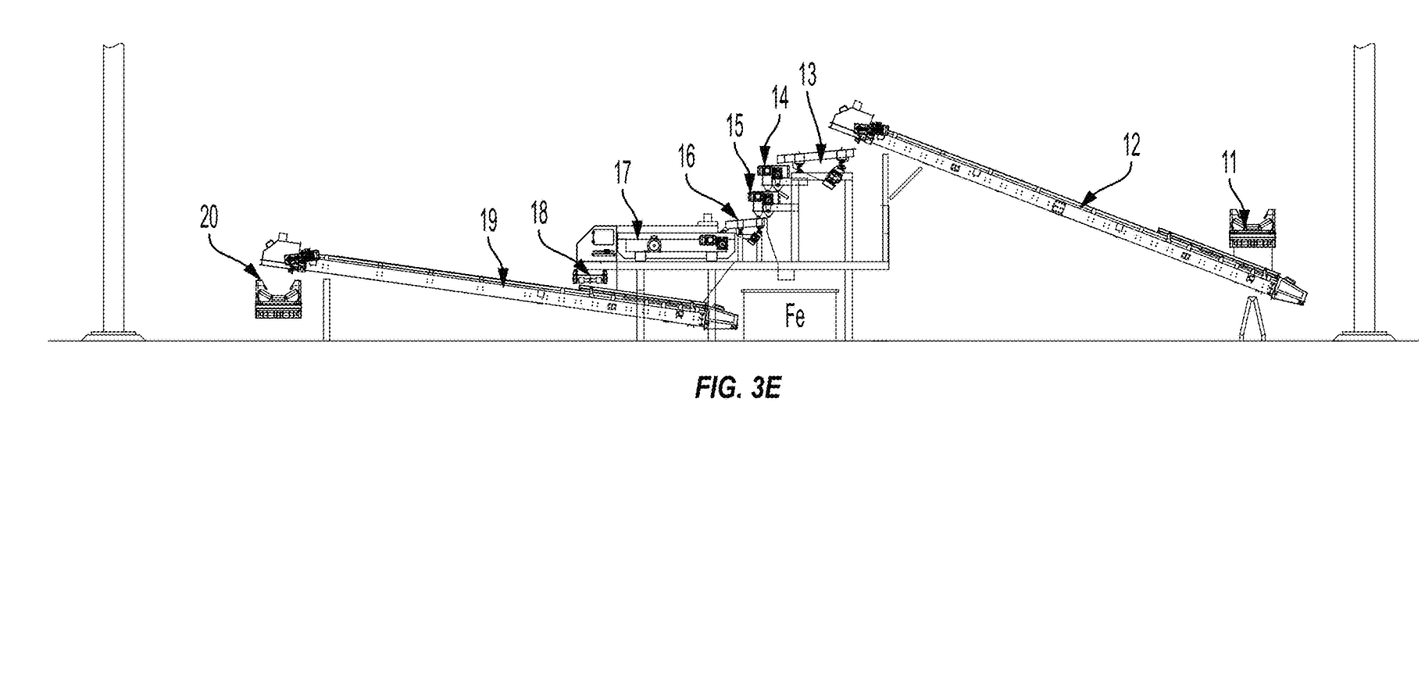
Figure 3F:
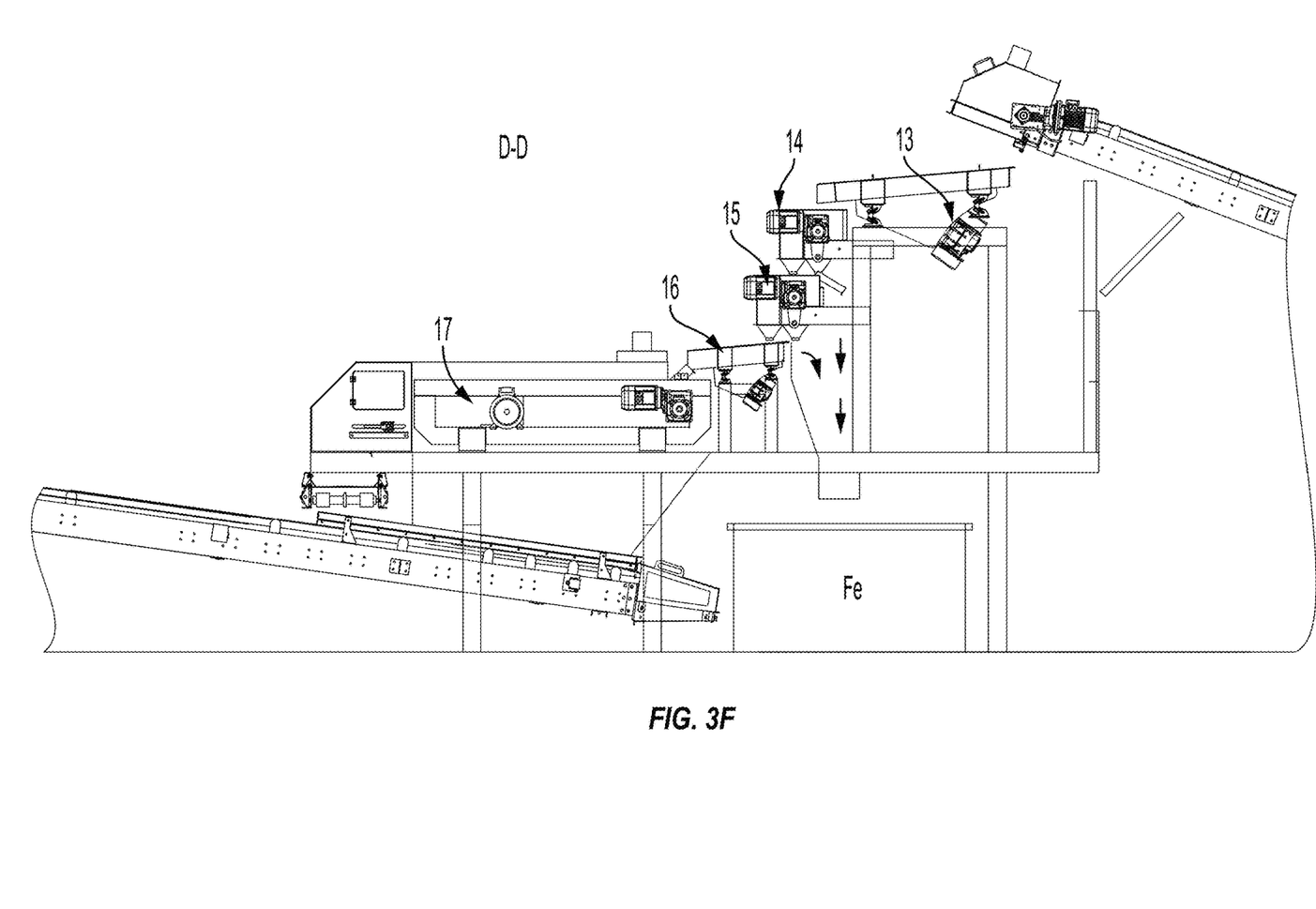

By referring to the flow chart of FIGS. 2A to 2C, this illustrates the main phases of a process according to the present invention.

In particular, the ashes coming from the incinerators before being used have to remain in the storage for at least 20-30 days, with the purpose of lowering the PH thereof through carbonation reactions.

At this point, the ashes can be in case treated to be reduced in sizes, deferrized and-metallized.

Although there are apparatuses for treatments of this type on the ashes, for the implementation of this phase, the inventors also devised and developed a process and an innovative apparatus, innovative on itself, providing effectively more performing results than known art and which, generally, could also be used in other fields, outside the present invention.

Consequently, a plant was devised for implementing this deferrization process. FIGS. 3A to 3F relate to the de-metallization plant according to the present invention. With reference to such figures, the plant elements are identified by numbers shown in the following legend:

| | |
|---|---|
| 21 | Mill opening power unit |
| 20 | Conveyor belt mm 650 × 12,000 |
| 19 | Conveyor belt mm 650 × 8,500 |
| 18 | Conveyor belt mm 500 × 5500 |
| 17 | Separator EMC 1500 |
| 16 | Vibrating table 1400 × 750 |
| 15 | Magnetic drum TM – N30.140 |
| 14 | Magnetic drum TM – N30.140 |
| 13 | Vibrating table 1400 × 1500 |
| 12 | Conveyor belt mm 650 × 9000 |
| 11 | Conveyor belt mm 650 × 17,300 |
| 10 | Tertiary mill BSI type PFC 105 |
| 9 | Mill vibrating feeder |
| 8 | Conveyor belt mm 600 × 9000 |
| 7 | Vibrating screen 2 Planes mm 1200 × 3000 |
| 6 | Bandaboard belt 650 × 8170 |
| 5 | Deferrizing belt |
| 4 | Conveyor belt mm 800 × 4500 |
| 3 | Extracting belt 800 × 6260 |
| 2 | Grid control hydraulic power unit |
| 1 | Loading hopper with light grid 80 mm |

According to such process, the ashes are subjected to two deferrization phases.

A primary deferrization phase provides that the material is extracted from an inlet hopper and re-launched on a belt 5 wherein a powerful deferrizer having permanent magnets separating the coarser ferrous portions is mounted.

By way of example, for this phase a belt magnetic separator 5 can be used having the following features:

Plate with permanent magnets made of Neodymium (sizes 900×700 h 180 mm);
Drums with diameter 300 mm with keyed and interchangeable through shaft with diameter 50 mm;
Interaxis drums 1,500 mm;
Rubber mat class 400, three cloths 4+2 with strips h=30 mm pitch 400;
Installed power 2.2 Kw The so roughly deferrized material is transported, through a belt system, to a vibrating screen 7 which separates the fine fraction 0÷8 mm from the coarse fraction 8÷80 mm.

By way of example, the vibrating screen 7 can preferably have the following features:

Screening planes: two
Sizes of the screening planes 1,200×3,000 mm.
Screening surface of each plane: 3.60 mq
ower motorization: 5.5 kw At this point, the coarse fraction is transferred to an impact mill 10 wherein it is subjected to a grinding phase and it is subjected to a granulometric reduction (with a reduction ratio of about 1/6-1/8). The more one pushes on crushing, the more effective the separation level is if the objective is not that of re-using the inert as MPS (Secondary Raw Material), a granulometric reduction as high as possible is preferred.

By way of example, the impact mill can be a hammer mill 10 with the following features:

Casing made of properly stiffened sheet
Inner armour plate made of chromium alloy
Hammers made of reversible chromium alloy
Side plates made of steel
Complete motorization (motor, belts, pulley and protection carter)
Coated discharge caisson
Supply vent
Vibrating feeder complete with suspensions
Hydraulic plant for the machine opening
Complete with sustaining structure
Side ramps complete with hand rails
Access ladder Downwards of the mill 10 the crushed material is joined again with the previously separated fine fraction to be subsequently treated in a secondary deferrization phase.

In this secondary deferrization phase, preferably through a vibrating feeder 13, the material is fed on a pair of high-efficiency magnetic drums 14, 15 which perform further separation of the ferrous fraction.

By way of example, the vibrating feeder 13 can have the following features:

Plate sizes 1,400×1,500 mm.
Two electromechanical vibrators with adjustable masses
Suspensions with elastic springs
Vibrating casing coated with anti-wear material
Installed power 2×1.5 kw Still by way of example, the magnetic drums 14, 15 can have the following features:

Diameter 300 mm.
Drum length 1.400 mm.
Constructed with permanent magnets made of Neodymium having high magnetic power
Rotating structure made of Stainless steel AISI 304 with cross strips on the surface for iron detachment
Rotating support and fixed support for fastening
Motor and reducer Then, downwards of the magnetic drums the material is supplied, preferably by means of a vibrating feeder 16 (similar to the first vibrating feeder 13), to a separator EMC 17 which separates, through a system with induced currents, the aluminium portions existing in the material.

By way of example, the induction separator 17 can have the following features:

Magnetic rotor: diameter 350 mm.—useful width 1.500 mm.—dynamic balancing level G 0.4 (maximum precision level)—keyed and replaceable through shaft—special magnets made of Neodymium, locked mechanically and sealed from the external environment, for a maximum safety and to prevent iron powder from entering and the consequent damage thereof—supplementary protection of the magnetic rotor implemented with cylinder made of stainless steel—outer cylinder made of fiberglass for belt rolling—CONCENTRIC technology—

Belt traction roller: steel with biconical turning for the belt self-centring—keyed and replaceable through shaft Conveyor belt: PVC material with two antistatic cloths with "Bandebord" for the containment of the materials to be treated Motorization: for traction of magnetic rotor—for traction of conveyor belt Switchboard: equipped with two inverters for adjusting the speed of the belt and of the magnetic rotor—emergency system which in case of black-out allows to remove the material present on the belt.

The ashes coming from the pre-treatment phase, preferably, according to the present invention have a composition similar to the one indicated in the following Table 1.

TABLE 1

| Ideal composition of the ashes | | | | | | | | | | | | |
|---|---|---|---|---|---|---|---|---|---|---|---|---|
| | Na2O | MgO | Al2O3 | SiO2 | P2O5 | SO3 | Cl2O | K2O | CaO | TiO2 | Fe2O3 | CuO | ZnO |
| % | 2.84 | 2.75 | 17.08 | 36.08 | 1.23 | 0.85 | 1.12 | 1.06 | 30.21 | 1.74 | 4.03 | 0.45 | 0.56 |

Preferably, the percentage Pc of ashes to be used according to the invention, is between 1% and 40% of the volume of the mixture used for the production of porcelain stoneware.

According to a preferred embodiment, such percentage Pc is between 10% and 30%, still more preferably between 15% and 25%.

Although it is to be meant that the other raw materials (apart from the ashes) which can be used to implement the porcelain stoneware according to the present invention could be evidently selected among those normally and typically used for such purpose, according to a preferred embodiment, raw materials having specific physical/chemical features can be used.

These materials were selected, also among those which can be found on the market, according to the following Table 2:

TABLE 2

| Raw materials | | |
|---|---|---|
| | Raw material | Percentage in the mixture |
| 1 | Kaolin BG (Industrial Minerals): | 12-15% |
| 2 | MF/TV (Svimisa) | 12-15% |
| 3 | Sigillo Clay (Saxa Gres) | 25-45% |
| 4 | Sasifo Sand (Sibelco) | 10-16% |
| 5 | Sigillo (Plasticizer clay) | 6-12% |

The producer of the commercial product is shown in brackets, however it is clear that raw materials with similar features could be used. The features of the raw materials shown in Table 1 are illustrated hereinafter.

Kaolin BG

| XRF Chemical analysis: | |
|---|---|
| | % |
| $SiO_2$ | 79.5 |
| $Al_2O_3$ | 14.0 |
| $Fe_2O_3$ | 1.40 |
| $TiO_2$ | 0.15 |
| CaO | 0.05 |
| MgO | 0.10 |
| $K_2O$ | 0.25 |
| $Na_2O$ | 0.10 |
| P.F. | 4.80 |
| S | 0.08 |

| Average grainsize distribution: | |
|---|---|
| Class mm | Weight % |
| +20.0 | 6 |
| 20.0-10.0 | 18 |
| 10.0-1.0 | 59 |
| 1.0-0.1 | 3 |
| −0.1 | 4 |

-continued

| | |
|---|---|
| Moisture | 9% |

| Average mineralogical analysis: | |
|---|---|
| | % |
| Quartz | 63 |
| Kaolin | 32 |
| Feldspars | 3 |
| Other | 2 |

MF/TV

| CHEMICAL ANALYSIS (%) | | |
|---|---|---|
| $SiO_2$ | 78.5 | ±1.5 |
| $Al_2O_3$ | 11.5 | ±1.5 |
| $Fe_2O_3$ | 0.6 | max |
| CaO | 0.3 | |
| MgO | 0.4 | |
| $Na_2O$ | 2.2-2.5 | |
| $K_2O$ | 4.2-4.5 | |
| $TiO_2$ | 0.06 | |
| $MnO_2$ | 0.03 | |
| L.O.I. | 2.2-2.5 | |
| Carbon | absent | |
| Sulphur | absent | |

| MINERALOGY ANALYSIS (%) | |
|---|---|
| QUARTZ | 40 |
| ORTHOCLASE | 35 |

-continued

| | |
|---|---|
| ALBITE | 12 |
| CLAY | 18 |
| FIRED PROPERTIES | |
| Firing shrinkage (%) | 10.5-11.5 |
| Absorption H$_2$O (%) | <0.1 |
| Colorimetric coordinates | L*65  a*3  b*8 |
| Cooking cycle [min] | 50 |
| Temperature (° C.) | 1230 |
| Oven thermal work (° C.) | 1130 |
| OTHER PROPERTIES | |
| Supplying humidity (max) (%) | 10 |
| Granulometry [mm] | 13.5 |
| Resistance to bending (drying) (kg/cm$^3$) | 28.0 |
| Test piece forming pressure (kg/cm$^3$) | 350 |
| Post pressing expansion (%) | 8.3 |

Sigillo Clay

| Oxides | % |
|---|---|
| SiO$_2$ | 73.60 |
| B$_2$O$_3$ | |
| Al$_2$O$_3$ | 13.15 |
| Fe$_2$O$_3$ | 3.30 |
| PbO | |
| CaO | 2.70 |
| BaO | |
| MgO | 1.25 |
| ZnO | |
| K$_2$O | 2.70 |
| Na$_2$O | 2.30 |
| Li$_2$O | |
| MnO$_2$ | 0.10 |
| TiO$_2$ | 0.75 |
| P$_2$O$_5$ | Tr |
| Calc. Loss | 2.25 |
| Total | 99.85 |

Sasifo Sand

| SiO$_2$ [%] | Al$_2$O$_3$ [%] | Fe$_2$O$_3$ [%] | K$_2$O [%] | Na$_2$O [%] | TiO$_2$ [%] | CaO [%] | MgO [%] |
|---|---|---|---|---|---|---|---|
| 89.55 | 5.88 | 0.365 | 2.130 | 1.709 | 0.085 | 0.190 | 0.082 |

All raw materials belonging to the formulation are dosed in the prefixed portion and carried, for example through a sequence of weighing caissons working continuously, to a grinding compartment. Herein they are finely ground, with granulometry preferably lower than 120 microns.

To this purpose, for example, the "hard" raw materials (for example ashes, Sasifo Sand, MF/TV) enter continuously the mill containing ground bodies such as pebbles and/or high-density alumina spheres, from the bottom thereof they come out finely ground, with granulometry preferably lower than 150 microns, preferably lower than 120 μm.

The other "soft" raw materials (for example clays) which do not require energy action, are finely dispersed, for example in a bowl mill.

At this point the two channels of raw materials join again, by forming one single mixture of components, still according to a controlled dosage.

Such mixture is then homogenized, thereafter through a wetting action during the rotation phase they are "granulated" that is brought to a humidity rate between 4% and 8%, preferably around 6%, and made basically spherical or granular to provide a correct evenness, this for example by wetting in bentonite dispersed in water.

At this point the mixture is ready to proceed to the subsequent steps.

The mixture is stored in silos, wherein it can rest and mature. The accumulation in silos further allows to implement a "lung", that is a reserve of material always available for the subsequent process stages.

After such storage, the process provides a phase for forming the product which can follow two different ways: pressing and extrusion.

The pressing, for example performed with presses SACMI PH 690, consists in carrying the mixture powders within a mould made of hardened steel wherein they are subjected to a pressing with a load comprised between 100 Kg/cmq and 400 Kg/cmq, preferably between 130 Kg/cmq and 250 Kg/cmq, providing the shape to the piece.

For example, for a typical sanpietrino, each piece will have sizes of about 11×11 cm for its tread surface, 8×8 cm for its base surface, and a thickness of about 7 cm. Upon preparing the piece, the shrinkage the product is subjected to during cooking is taken into consideration and therefore that the end product will have sizes of about 10×10 cm for the tread surface, circa 7×7 cm for the base surface and about 6 cm for the average thickness.

Some types of product provide geometrical features and complex shapes, which do not make them suitable to a treatment by pressing.

For example, still by making reference to the sanpietrino, some specific pieces (pavement stone, tiles in 20×20, 20×40, 40×60 format, small cubes 4.5×4.5×4.5) could be required for the construction of particular areas of the paving.

For these pieces, it is preferable to add to the mixture powders taken from the storage silos, previously turbo-dissolved specific clays, which make the mixture more elastic so as to be able to drawing it, that is forcing it through a screw die or extruder wherein the suitable shape and size is provided to the product.

For example, plasticizing clays, such as the same SIGILLO, or even other clays (for example English ball Clay) can be added by 5-12%.

The main extrusion parameters, according to the present invention, are a depression between 65 and 71 mm Hg, and a pressure between 18 and 21 kg/cmq.

In fact, in order to extrude, plasticity or malleability of the mixture (20% of humidity) has to be increased, thereafter a suitable depression is created to remove air and the mixture is forced, by using a screw, through a slit therewith the material assumes the wished shape.

Once come out of the press and/or the extruder, the pieces are positioned on wagons manufactured with materials suitable to withstand the oven's high temperatures.

Within the present invention, it was seen that with ovens having single-layered rollers, traditionally used for the treatment of porcelain stoneware, it would not be possible to cook the pieces sufficiently.

Therefore, according to the present invention, the cooking process takes place preferably in tunnel-like ovens, of the type used for sanitary articles and products for building (bricks and brick tiles).

Then the pieces are conditioned with humidity lower than 1%, preferably lower than 0.7%, still more preferably around 0.5%, thereafter they enter a tunnel-like oven wherein within 6/12 hours they are brought to about 1150° C. and subsequently brought back to low temperature, the whole according to a predefined firing curve.

Figure 4:
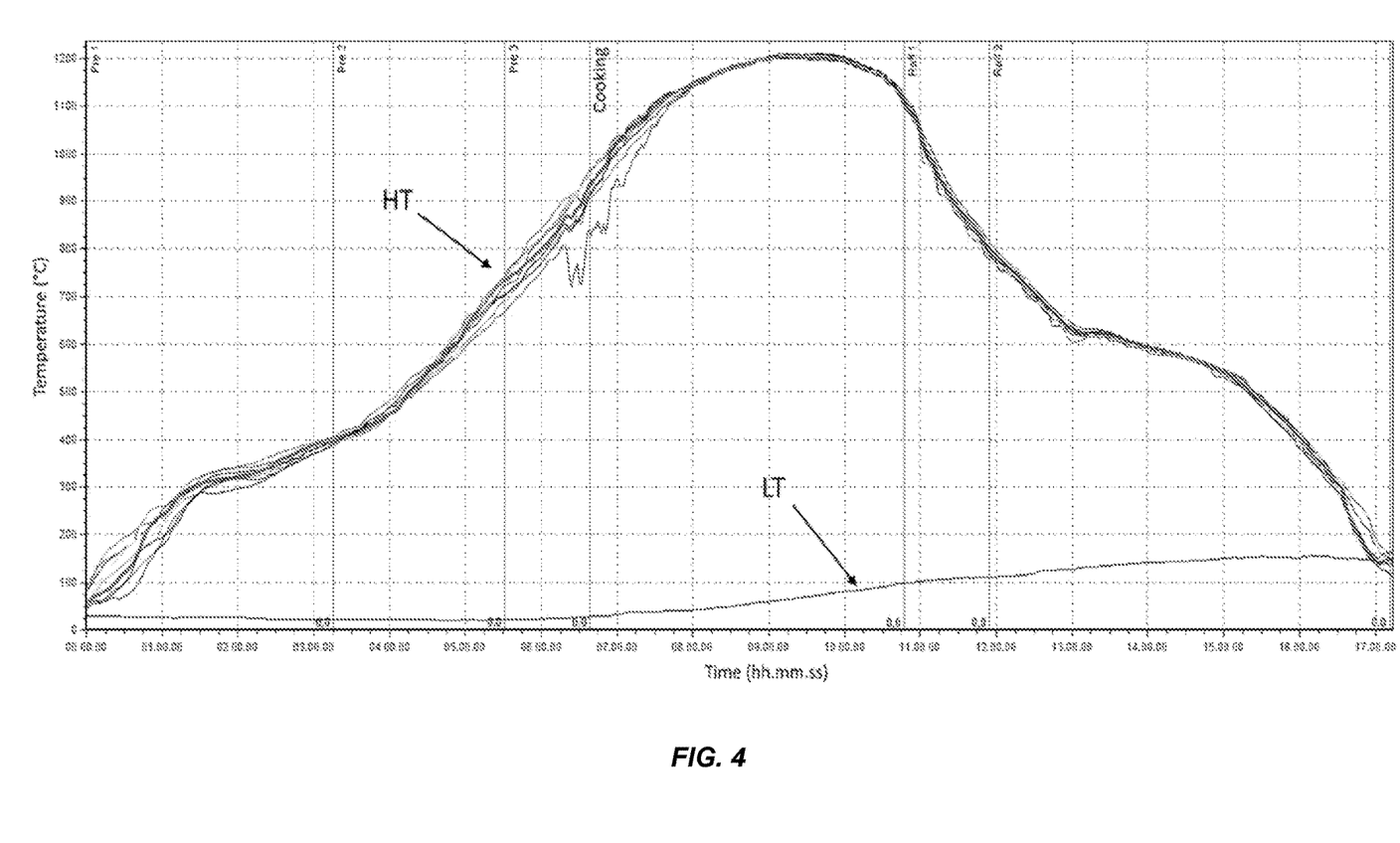
FIG. 4 is a graph of a possible firing curve according to the present invention.

Generally, a firing curve according to the present invention, is so as to allow to heat the pieces, from an inlet temperature Ti at the oven inlet between 50° C. and 100° C., until a maximum temperature Tm between 1,100° C. and 1,300° C. in a heating time Th between 6 and 10 hours.

Therefore, a cooking time Tc at this maximum pressure Tm between 40 min and 90 minutes is provided.

Subsequently, the pieces are subjected to a controlled cooling to as to bring them back to an outlet temperature Tu from the oven comprised between 100° C. and 200° C. in a cooling time TI comprised between 6 hours and 8 hours.

In all phases of course a punctual control of temperatures is provided, so that the resulting firing curve has no tracts with particularly steep course, and which keeps its course substantially monotonous (increasing, constant, decreasing) in the three main phases (heating, cooking, cooling).

FIG. 4 shows a preferred example of firing curve according to the present invention, wherein, as it can be seen from the graph, the parameters are the following:
Heating Phase
 Ti: ≈70° C.;
 Tm: ≈1,200° C.;
 Tr: ≈9 h;
Cooking Phase:
 Tc: ≈1 h;
Cooling Phase;
 Tu: ≈120° C.;
 Ti: ≈7 h.

In FIG. 4, the curves of temperature HT are shown at each one of the thermocouples present in the oven. It is evidently to be meant that these curves HT substantially and ideally should be all coincident therebetween.

The curve at the bottom LT is the reading of temperatures below the oven plane, wherein there are materials sensible to high temperatures and then it is required that in these areas the temperature does not increase too much to avoid damages.

At the outlet of the oven a selection phase can be provided to remove in case defective pieces.

At last, the pieces can be packaged before being sent to the warehouse of finished products.

The present invention has been sofar described with reference to preferred embodiments thereof. It is to be meant that each one of the technical solutions implemented in the embodiments described herein by way of example, could advantageously be combined differently therebetween, to create other embodiments, belonging to the same inventive core and however all within the protective scope of the herebelow reported claims.

The invention claimed is:

1. A process for preparing a porcelain stoneware product comprising:
 treating ashes with carbonation reactions for at least 20 days to lower a pH of the ashes, wherein the ashes are residual from combustion of urban waste;
 performing deferrization and de-metallization of the ashes;
 combining the ashes with a plurality of raw materials for preparing porcelain stoneware to provide a mixture, wherein the mixture comprises between 1% and 40% by volume of the ashes;
 grinding a dose of the mixture to provide a particle size of less than 150 m; and
 homogenizing the mixture with wetting during a rotation phase to provide a humidity rate between 4% and 8%,
 wherein the porcelain stoneware product comprises a tread surface, a base surface, and an average thickness extending from the tread surface to the base surface of greater than or equal to 4.5 cm, and
 wherein said ashes have a composition of:

| | $Na_2O$ | MgO | $Al_2O_3$ | $SiO_2$ | $P_2O_5$ | $SO_3$ | $Cl_2O$ |
|---|---|---|---|---|---|---|---|
| % | 2.84 | 2.75 | 17.08 | 36.08 | 1.23 | 0.85 | 1.12 |
| | $K_2O$ | CaO | $TiO_2$ | $Fe_2O_3$ | CuO | ZnO | |
| % | 1.06 | 30.21 | 1.74 | 4.03 | 0.45 | 0.56. | |

2. The process according to claim 1, wherein the mixture comprises between 10% and 30% by volume of the ashes.

3. The process according to claim 1, wherein the mixture comprises between 15% and 25% by volume of the ashes.

4. The process according to claim 1, further comprising forming the porcelain stoneware product by pressing the mixture into a mold.

5. The process according to claim 4, wherein said pressing is performed with a load between 100 kg/cmq and 400 kg/cmq.

6. The process according to claim 1, further comprising a step for forming the porcelain stoneware product by extrusion.

7. The process according to claim 6, wherein said extrusion is performed with a depression between 65 mm Hg and 71 mm Hg, and a pressure between 18 $kg/cm^2$ and 21 $kg/cm^2$.

8. The process according to claim 1, further comprising a cooking step of the porcelain stoneware product according to a predefined firing curve, said firing curve comprising a heating phase in which the porcelain stoneware product is brought to a maximum temperature between 1.100° C. and 1.300° C. in a heating time between 6 hours and 10 hours.

9. The process according to claim 8, wherein said firing curve comprises a cooking phase at said maximum temperature for a cooking time comprised between 40 min and 90 min.

10. The process according to claim 8, wherein said firing curve comprises a controlled cooling phase for carrying the porcelain stoneware product from said maximum temperature to an outlet temperature comprised between 100° C. and 200° C. in a cooling time between 6 hours and 8 hours.

11. The process according to claim 1, wherein the particle size is less than 120 m.

12. The process according to claim 4, wherein the pressing is performed with a load between 130 kg/cmq and 250 kg/cmq.

* * * * *